R. HILTON.
FAUCET.
APPLICATION FILED DEC. 21, 1914.
1,165,672.
Patented Dec. 28, 1915.
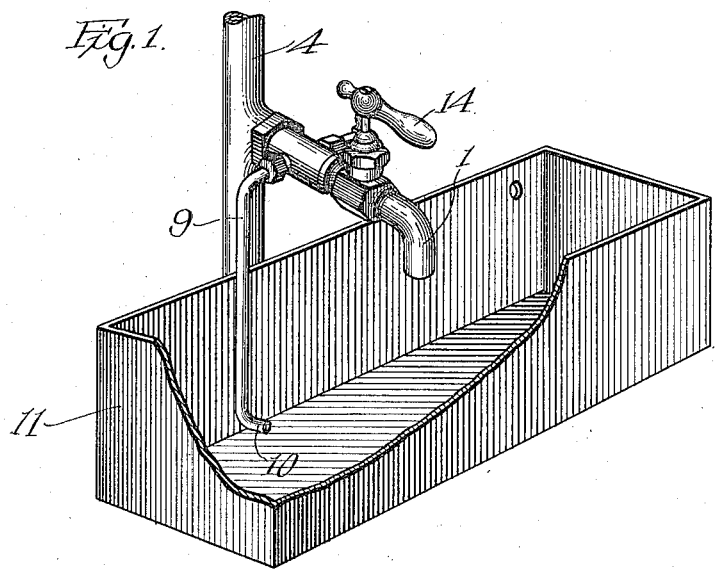
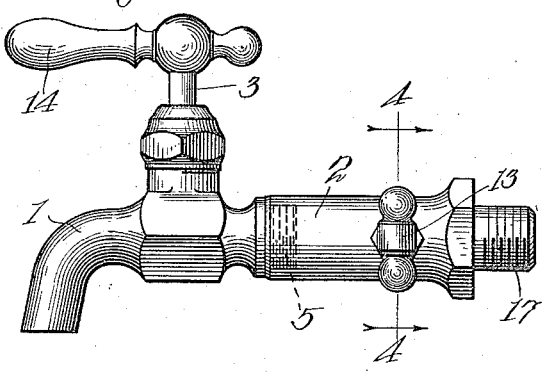
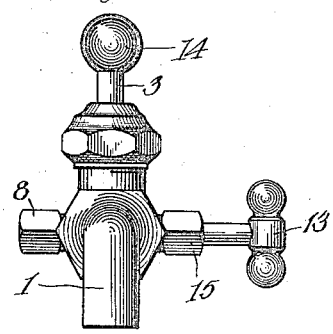
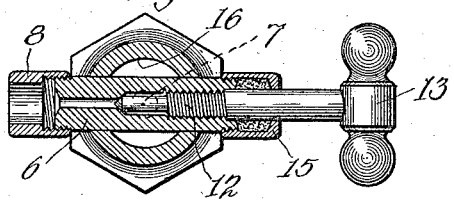
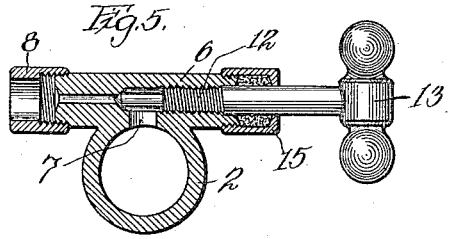
Witnesses:
Leo J. Dufrais.
W. K. Olson.
Inventor:
Robert Hilton
by Lotz & Scheill Attys

UNITED STATES PATENT OFFICE.

ROBERT HILTON, OF CHICAGO, ILLINOIS.

FAUCET.

1,165,672.    Specification of Letters Patent.    Patented Dec. 28, 1915.

Application filed December 21, 1914. Serial No. 878,300.

*To all whom it may concern:*

Be it known that I, ROBERT HILTON, citizen of the United States, residing at Chicago, in the county of Cook and State of Illinois, have invented certain new and useful Improvements in Faucets; and I do hereby declare the following to be a full, clear, and exact description of the invention, such as will enable others skilled in the art to which it appertains to make and use the same.

My invention relates to faucets and more particularly to means for controlling the flow of liquid from a faucet independently of the customary stop-cock, so as to permit the maintaining and controlling of a relatively small continuous flow of liquid without interfering with the normal use of the faucet.

In establishments selling liquid refreshments, it is desirable to provide means for rinsing the glasses and preferably for affording a continuously changing supply of rinsing water for this purpose. Indeed, the regulations in some cities now make it obligatory for dispensers of soda water and other drinks to use running water for the rinsing of the glasses. For this purpose, it has heretofore been customary to provide a rinsing tank adjacent to the faucet, and either to leave this faucet partly turned on so as to afford a continuous but relatively small flow of water from the faucet into the rinsing tank, or to provide a separate supply pipe leading to the tank. In the former case the noise of the water flowing from the faucet is objectionable, and the use of the faucet for supplying the rinsing water interferes to some extent with its other uses. Moreover, in manipulating the faucet to provide a greater flow of water for other purposes, it often happens that the same afterward is shut off entirely, thereby violating the ordinance requirements for a continuous flow of water through the rinsing tank. On the other hand, the separate supplying of water from the piping to the tank has heretofore involved expensive plumbing.

My invention in its general aspect relates to a combination faucet adapted to be connected to the water supply pipe after the usual manner and affording two outlets, one of these being the normal mouth of the faucet and controlled by the usual stop-cock, while the other is a tap controlled by a separate valve and connected by cheaply and easily installed piping to the rinsing tank.

The objects of my invention may be accomplished with substantially equal facility in a number of different ways and may be embodied either in a faucet having both outlets substantially integral therewith, or in an intermediate member adapted to be interposed between a standard faucet and the regular water supply pipe for affording the auxiliary outlet and a separate control of the latter. Moreover, the embodiments of my invention may be varied greatly in design, a few of the desirable types being shown in the accompanying drawings in which—

Figure 1 is a fragmentary perspective view of a rinsing tank and water supply arrangement showing an application of my invention. Fig. 2 is an enlarged side elevation of the faucet of Fig. 1. Fig. 3 is an enlarged front elevation of the same. Fig. 4 is an enlarged transverse section through the faucet of Fig. 2 along the line 4—4. Fig. 5 is a similar transverse section through an auxiliary type of another faucet embodying my invention.

In accomplishing my invention, I provide the tubular body 1 of the faucet with a tubular extension 2 interposed between the regular valve or stop-cock 3 and the water supply pipe 4 to which the faucet is connected. The extension 2 may either be cast integral with the body of the socket, or may be a separate element (as in Fig. 2) connected to a standard faucet by threads 5. Transversely disposed with respect to the extension portion 2 is an auxiliary tubular member 6 having its bore connected to the bore of the element 2 by a suitable passage 7. This auxiliary tubular member is connected by any desirable means, such as a packing joint 8 to an outlet pipe 9 which preferably terminates in an end portion 10 disposed within the rinsing tank 11 near the bottom of the latter. Associated with the auxiliary tubular member 6 is a needle valve 12 controlled by a handle 13, which latter is preferably disposed at one side of the passage so as not to be in the way of the handle 14 which operates the stop-cock 3, the joint between the needle valve and the tubular member being preferably made water-tight by a packing box 15.

The tubular member 6 is preferably considerably smaller in outside diameter than the bore of the element 2, and when these portions are disposed as in Fig. 4 with their axes intersecting, the difference in size will afford a pair of passages 16 permitting water to flow through the bore of the element for supplying water to the mouth of the faucet proper. However, I do not wish to be limited to this particular disposition of the main and auxiliary tubular elements, nor to the other details of the construction herein disclosed, as the latter might be modified in many ways without departing from the spirit of my invention. For example, the auxiliary tube 6 might be disposed externally of the tubular member 2, as in Fig. 5, in which case the passage 7 connecting the bores of the said portions would extend radially of the element 2 and the latter would have its bore entirely free for the passage of the full amount of liquid therethrough.

The outlet pipe 9 may readily be made of block tin, copper, or other flexible tubing permitting a ready bending of the same to the desired shape and it will be evident that the entire cost of the faucet of my invention (including the outlet pipe) will be very much smaller than the cost of installing separate connections to the water supply system. Moreover, this cost may be still further reduced by constructing the auxiliary faucet portion separately (as indicated in Fig. 2) with a female thread 5 and an exposed male thread 17 both corresponding to the size of the thread on the standard faucet to which this auxiliary portion is attached, so as to interpose this separable portion between an ordinary faucet and the supply pipe. In each case, the maintaining of a continuous flow of water through the pipe 9 will not interfere in any way with the normal use of the main portion of the faucet, hence by interposing such an auxiliary and separately controlled outlet between a regularly installed faucet and the piping to which the latter was normally connected, I am able to accomplish the desired purpose with a minimum of expense.

I claim as my invention:

1. A coupling member for connecting a faucet to a water supply pipe, comprising a tubular element threadedly connected to said pipe and faucet, a transverse tube carried by said element and having its bore connected to the bore of said element, the bore of said transverse tube being equipped with a contraction affording a valve seat, and a needle valve threaded in said transverse tube and equipped with a tip adapted to seat on said valve seat.

2. A faucet for use with a water supply pipe, including a hollow body member having its bore connected to the bore of said pipe, a manually operable stop-cock carried by the body member and controlling the outlet thereof, a tubular element carried by the body member transversely of the bore thereof and projecting in opposite directions beyond the sides of said body member, said tubular element having its bore connected to the bore of the body member and having contracted and threaded portions of its bore disposed respectively at opposite sides of the connection between the said bores of the tubular element and the body member; and a needle valve having a stem threaded into the said threaded portion of the bore of the tubular member and having a tip normally engaging the entrance to the contracted portion of the last named bore.

In testimony whereof I have signed my name in presence of two subscribing witnesses.

ROBERT HILTON.

Witnesses:
ALBERT SCHEIBLE,
M. M. BOYLE.

Copies of this patent may be obtained for five cents each, by addressing the "Commissioner of Patents Washington, D. C."